US012656173B2

(12) United States Patent
Koehler

(10) Patent No.: US 12,656,173 B2
(45) Date of Patent: Jun. 16, 2026

(54) SENSOR ARRANGEMENT FOR OPTICAL ELEMENTS IN LASER MATERIAL PROCESSING HEADS

(71) Applicant: II-VI Delaware, Inc., Wilmington, DE (US)

(72) Inventor: Gunnar Koehler, Wilmington, DE (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 18/955,580

(22) Filed: Nov. 21, 2024

(65) Prior Publication Data

US 2026/0049864 A1     Feb. 19, 2026

(30) Foreign Application Priority Data

Aug. 15, 2024     (DE) ..................... 10 2024 123 325.7

(51) Int. Cl.
G01J 1/02          (2006.01)
G01J 1/44          (2006.01)
G02B 5/136        (2006.01)

(52) U.S. Cl.
CPC ........... G01J 1/0271 (2013.01); G01J 1/0204 (2013.01); G01J 1/0238 (2013.01); G01J 1/44 (2013.01);
(Continued)

(58) Field of Classification Search
CPC ...... G01J 1/0271; G01J 1/0204; G01J 1/0238; G01J 1/44; G01J 2001/0276; G01J 2001/446; G02B 5/136
See application file for complete search history.

(56) References Cited

U.S. PATENT DOCUMENTS 6,024,458  A  *   2/2000   Lundgren ................ G02B 7/00
                                                       359/399
7,236,234  B2 *   6/2007   Hagleitner ............ G01S 7/4813
                                                       356/5.01

FOREIGN PATENT DOCUMENTS

DE          102011075465 A1     11/2012
DE          102021131878 A1      9/2022
(Continued)

OTHER PUBLICATIONS

Official Action issued by German Patent and Trademark Office on Apr. 4, 2025 for DE Application No. 10 2024 123 325.7.
(Continued)

*Primary Examiner* — Seung C Sohn
(74) *Attorney, Agent, or Firm* — McAndrews, Held & Malloy

(57)          ABSTRACT

The present disclosure provides a sensor arrangement for reflecting scattered light from a laser beam. The sensor arrangement comprises a first optical element; a cone of a housing disposed behind the first optical element in the direction of the beam path of a laser beam, where the cone of the housing comprises a conical staircase-shaped reflector whose shape corresponds to the shape of the cone of the housing, and where the conical staircase-shaped reflector is formed of a plurality of ring-shaped elements, with each ring-shaped element having reflector surfaces on the inner side facing the beam path of the laser beam; and an element for receiving the light reflected by the respective reflector surfaces of the plurality of ring-shaped elements is arranged on the side of the optical element opposite to the cone of the housing.

17 Claims, 5 Drawing Sheets

(52) U.S. Cl.
CPC ...... *G02B 5/136* (2013.01); *G01J 2001/0276*
(2013.01); *G01J 2001/446* (2013.01)

(56) References Cited

FOREIGN PATENT DOCUMENTS

| | | | |
|---|---|---|---|
| DE | 102022112524 | A1 | 11/2023 |
| DE | 102024123325 | B3 | 10/2025 |
| JP | 2018075610 | A | 5/2018 |
| WO | 2014/159727 | A1 | 10/2014 |

OTHER PUBLICATIONS

Grant Decision issued by German Patent and Trademark Office, dated Aug. 20, 2025 for DE Patent 10 2024 123 325.
(English Translation) Official Action issued by German Patent and Trademark Office on Apr. 4, 2025 for DE Application No. 10 2024 123 325.7.
(English Translation) Grant Decision issued by German Patent and Trademark Office, dated Aug. 20, 2025 for DE Patent 10 2024 123 325.
German Patent Pamphlet DE 102024123325B3.
(Translation) German Patent Pamphlet DE 102024123325B3.
(Translation) Japanese Patent 2018075610A for Method And Device For Detecting Stain Of Optical Element And Laser Processing Head.

\* cited by examiner

A

B

SENSOR ARRANGEMENT FOR OPTICAL ELEMENTS IN LASER MATERIAL PROCESSING HEADS

CROSS-REFERENCE TO RELATED APPLICATIONS

The present application claims priority to German Patent Application DE 10 2024 123 325.7 filed on Aug. 15, 2024. The aforementioned application is hereby incorporated herein by reference in its entirety.

FIELD OF THE DISCLOSURE

The present disclosure relates generally to a sensor arrangement for monitoring optical elements in laser material processing heads and a method using the sensor arrangement.

BACKGROUND OF THE DISCLOSURE

Lasers, laser processing heads and systems, components and accessories for these as well as laser measuring instruments are generally know in the art. The laser processing heads and systems are designed for processing materials, including welding, soldering and cutting.

Laser processing heads and systems comprise a large number of optical elements. For beam shaping, laser processing systems use lenses, for example, which collimate or focus the laser beam. The optical elements are usually arranged in groups along the optical axis and are combined in so-called tubes. Entire groups of optical elements can often be exchanged as required, rather than having to replace a large number of individual elements.

When workpieces are welded and cut, emissions occur which can be deposited in the vicinity of the processing area and thus lead to a restriction of the function of laser optics due to deposits on the optical surfaces. These deposits not only limit the performance of the optical systems but can also damage or even destroy the laser optics.

The surface of an optical element, e.g., a protective glass or a lens, is therefore advantageously monitored regarding the deposition of dirt or emissions.

As the signal ratio after radiation through the optical element between the desired beam path and scattered radiation due to contamination or deposits is significantly greater in the optical direction of propagation than in the opposite direction of propagation, it would be advantageous to arrange a sensor behind the optical element. A sensor for monitoring a process protection glass of a cutting optic, for example, would then have to be arranged inside the pressure or flow chamber for the cutting gas in order to be able to follow this advantageous arrangement. On the one hand, the effort involved in placing this sensor there in a pressure-tight manner and connecting it electrically to the outside is very high, and on the other hand, this arrangement can disturb the rotational symmetry of the cutting gas flow. It is therefore disadvantageous to arrange the sensor in this way.

Solutions are known from the state of the art that measure the scattered light signal on the cylindrical cladding surface of an optical element. The disadvantage of such solutions is that the signal is strongly dependent on the condition of the cladding surface and the ratio of clean to dirty signal transverse to the optical propagation direction is only low.

Furthermore, arrangements are known in the prior art in which the optical sensor is arranged in the opposite direction to the optical propagation direction and is arranged in the direction of the optical propagation direction and also only achieves a low signal ratio.

An arrangement is also known from the state of the art in which the sensor is arranged in the optical direction of propagation and thus achieves a high signal ratio but must also be spatially arranged against the direction of propagation.

Furthermore, an arrangement is known in which the signal of a transmitting diode is reflected on the optical surface. The disadvantage of this arrangement is that both elements must be in the direction of optical propagation, and only heavy contamination can lead to interference.

The surface temperature of optical elements can also be measured using a pyrometer. However, these operate at wavelengths of 2~14 μm, for which quartz glass is barely permeable, and are therefore only of limited use in the case of transmitted radiation.

Further limitations and disadvantages of conventional and traditional approaches will become apparent to one of skill in the art, through comparison of such systems with some aspects of the present disclosure as set forth in the remainder of the present application with reference to the drawings.

SUMMARY OF THE DISCLOSURE

The present disclosure provides a sensor arrangement which avoids the disadvantages of the prior art solutions.

Other aspects, features and advantages of the present disclosure will readily be apparent from the following detailed description, which simply illustrates preferred embodiments and implementations. The present disclosure may also be realized in other and different embodiments and its various details may be modified in various obvious aspects without departing from the teachings and scope of the present disclosure. Accordingly, the drawings and descriptions are to be considered illustrative and not limiting. Additional features and advantages of the disclosure are set forth in part in the following description and will be apparent in part from the description or may be inferred from the embodiment of the disclosure.

BRIEF DESCRIPTION OF THE DRAWINGS

The disclosure is illustrated in more detail below with reference to the drawings. It is obvious to the person skilled in the art that these are only possible, exemplary embodiments, without the disclosure being necessarily limited to the embodiments shown, wherein.

3

Figure 5:
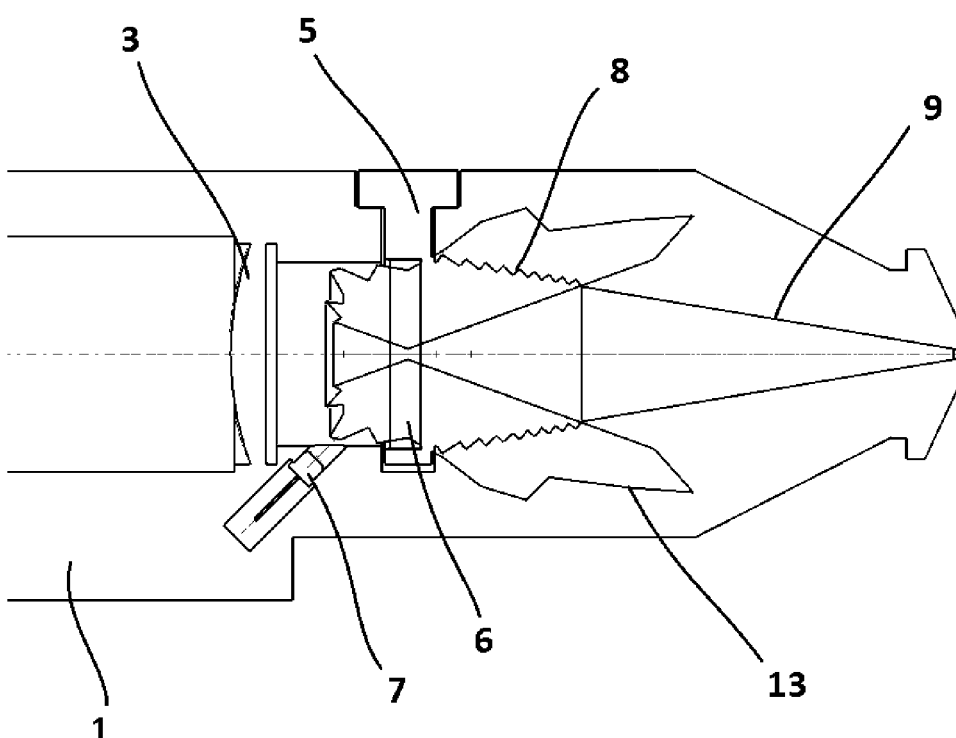

FIG. 5. shows the distribution of the signal-to-noise ratio starting from the protective glass according to an example embodiment of the disclosure.

Figure 6:
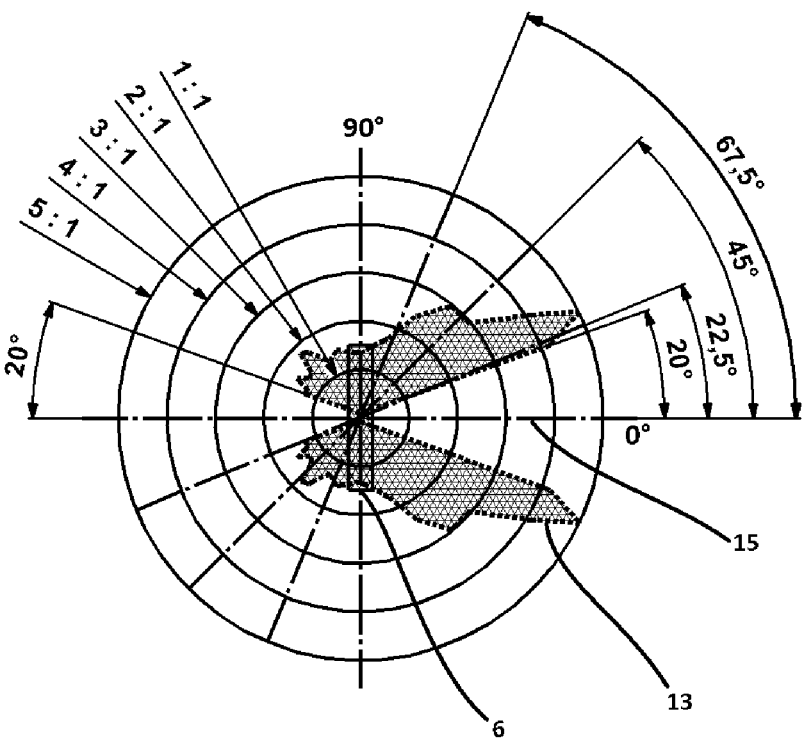

FIG. 6 shows the signal ratio of a dirty protective glass to a clean one plotted in polar coordinates according to an example embodiment of the disclosure.

Figure 7:
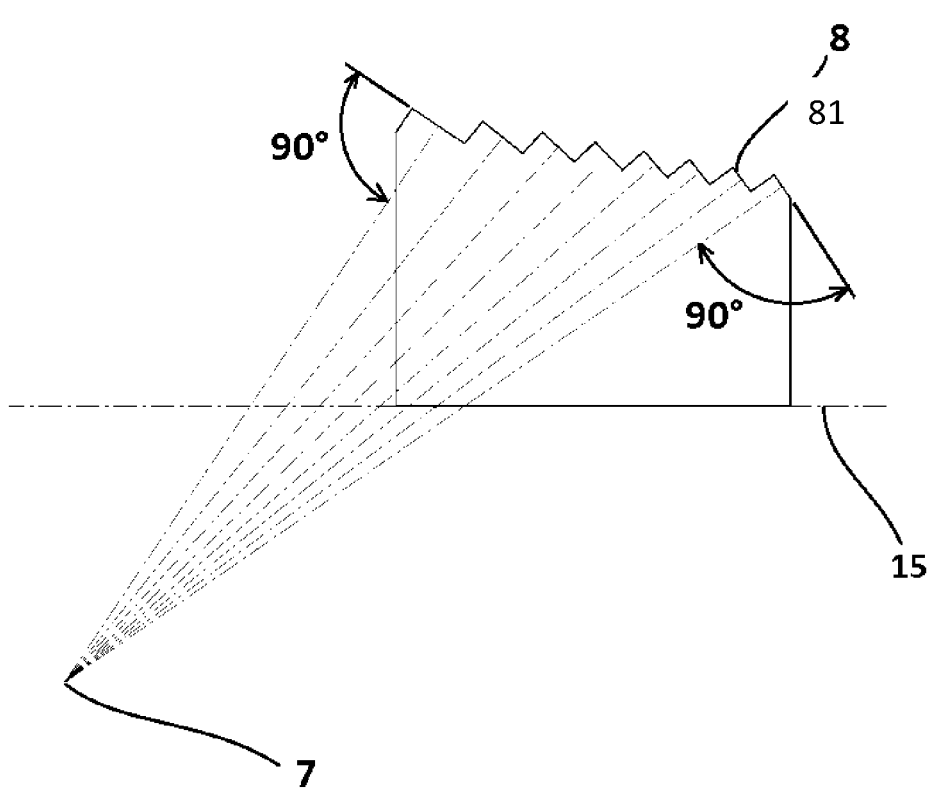

FIG. 7 shows the arrangement and inclination of the reflective inner surfaces of the reflector on the light sensor according to an example embodiment of the disclosure.

DETAILED DESCRIPTION OF THE DISCLOSURE

The present disclosure relates generally to a sensor arrangement for monitoring optical elements in laser material processing heads and a method using the sensor arrangement.

For the purposes of the present disclosure, optical elements are to be understood as lenses, protective glasses, mirrors and beam shaping elements. The term fixation in connection with an optical element comprises the centering and positioning of the optical element in the beam path.

The present disclosure provides one or more cylindrically or conically arranged reflectors which are arranged in the optical propagation direction, whereby these reflect the forward scattering through the optical element back through the optical element. This scattered light can then be detected by means of an optical sensor, which is arranged in front of a pressure chamber in the opposite direction to the optical propagation direction. The sensor can be a photodiode, for example.

The reflective structure according to an example embodiment of the present disclosure may be embedded in the base material of a gas guiding cone, which is usually made of aluminum. The reflective structure according to the present disclosure thus reflects the light scattered forward by the dirty optical element back through the optical element to the sensor. The light coming from the cutting process is reflected transversely to the beam axis and therefore hardly reaches the sensor. The inner contour of the reflective structure follows the conical cutting gas supply and therefore does not interfere with the cutting gas flow. This structure can extend over one, several areas or the entire conical area of the cutting gas tip.

FIG. 1A shows a laser material processing head with a sensor arrangement according to an example embodiment of the present disclosure. The laser beam 4 is coupled into the housing 1 of the laser material processing head on the left side of the embodiment shown. Collimating lens 4 is arranged in front of focusing lens 3. The focused laser beam 4 passes through the optical element 6, which in the embodiment shown is a protective glass in a drawer 5, which in turn separates the interior of the cutting gas cone 9 from the rest of the interior of the housing 1. The cutting gas outlet 10 is also the laser process point on which laser beam 4 is focused.

Conically stepped reflectors 8 are arranged in the cutting gas cone 9. The shape of the reflector 8 follows the conical shape of the cutting gas cone, whereby the reflector is made up of a large number of ring-shaped elements, which have reflectors pointing inwards in the direction of the optical element, whereby the reflector thus has a staircase shape in cross-section with differently angled steps. Due to the conical and thus tapering diameter of the cutting gas cone, the respective ring-shaped elements of the reflector must be angled differently in relation to the surface of the optical element.

4

Figure 1:
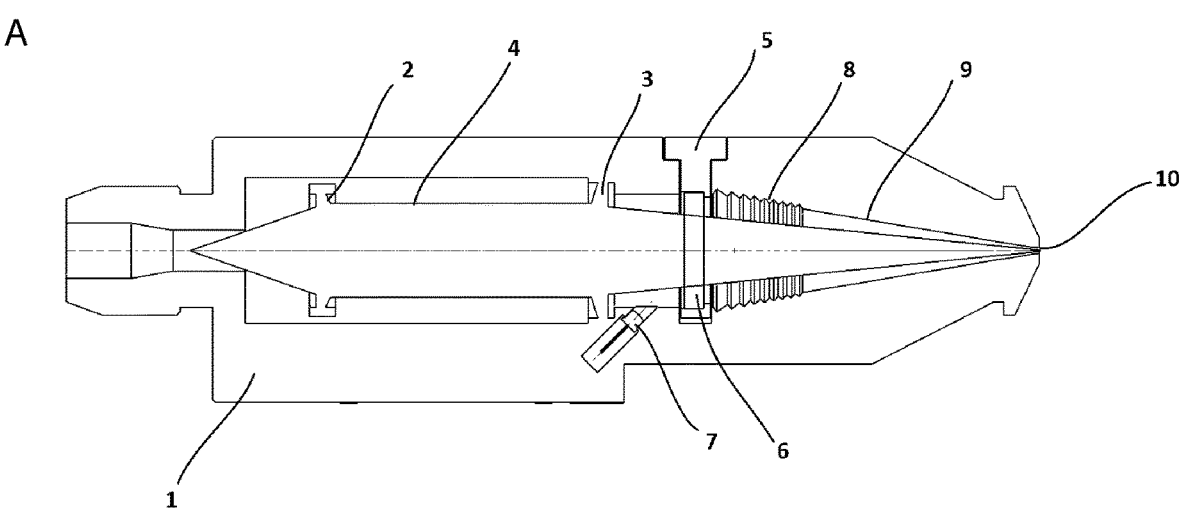
FIG. 1A shows a laser material processing head with a sensor arrangement for direct measurement of reflected scattered light according to an example embodiment of the disclosure.
FIG. 1B shows a laser material processing head with a mirror for deflecting reflected scattered light onto a light sensor according to an example embodiment of the disclosure.
Figure 1:
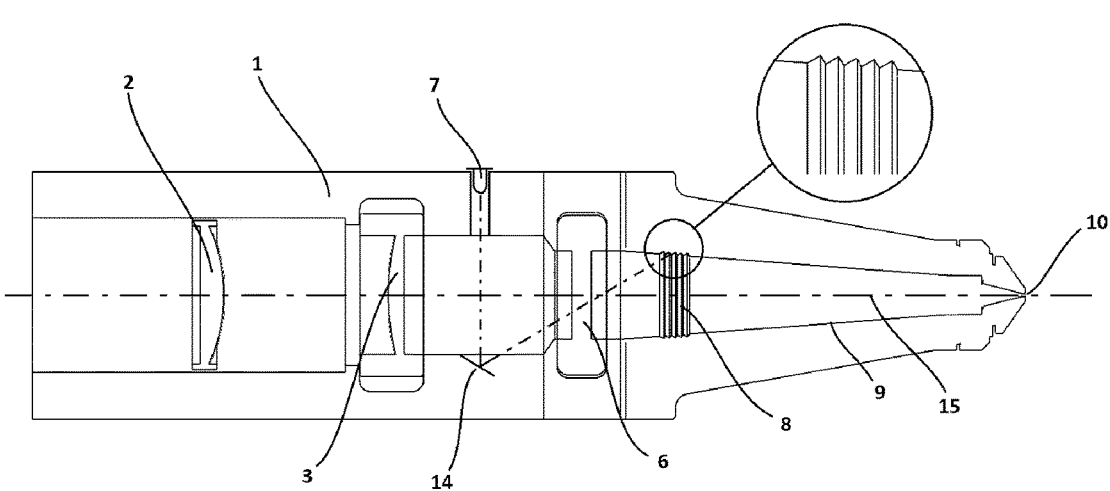

A light sensor 7 is arranged in the beam direction of the laser beam 4 in front of the optical element 6, the protective glass in FIG. 1, i.e., on the opposite side of the optical element 6 to the reflectors 8. This is arranged at an angle in relation to the surface of the optical element 6 in the direction of the ring-shaped elements of the reflector 8. Alternatively, a deflecting mirror 14 can be arranged accordingly, which deflects the light reflected by the ring-shaped element of the reflector 8 towards a light sensor 7 (see FIG. 1B).

Figure 2:
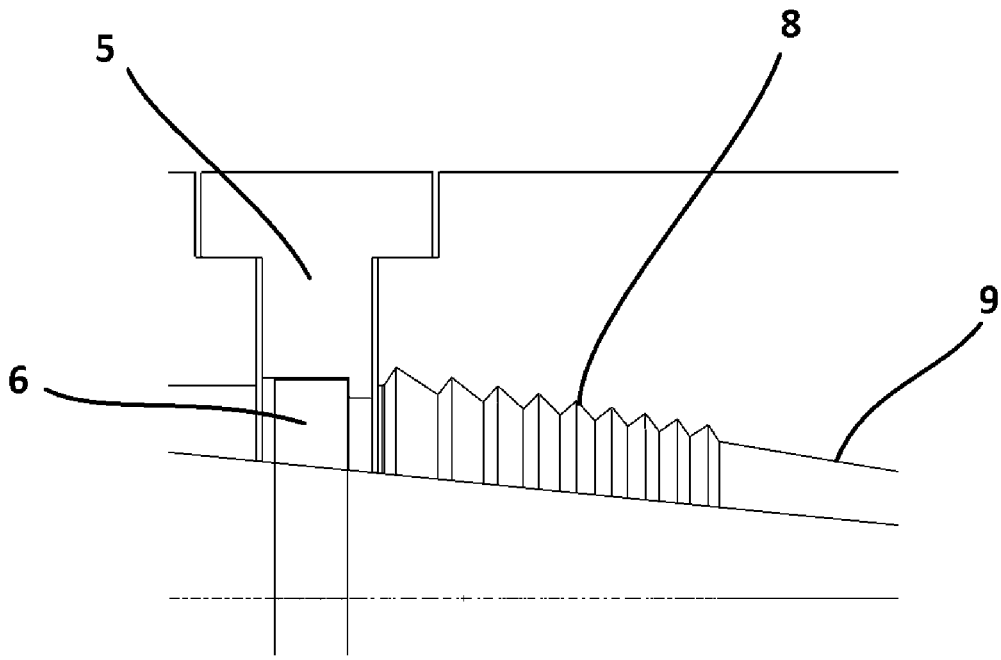
FIG. 2 shows in detail a conical staircase-shaped reflector in one embodiment with a protective glass as an optical element, which is arranged in a protective glass drawer, according to an example embodiment of the disclosure.

FIG. 2 shows in detail an example embodiment of a conically stepped reflector behind an optical element 6 as a protective glass, which is arranged in a drawer 5. Behind the optical element 6 is a cutting gas cone 9. The conical staircase-shaped reflector 8 is arranged behind the optical element 6.

Figure 3:
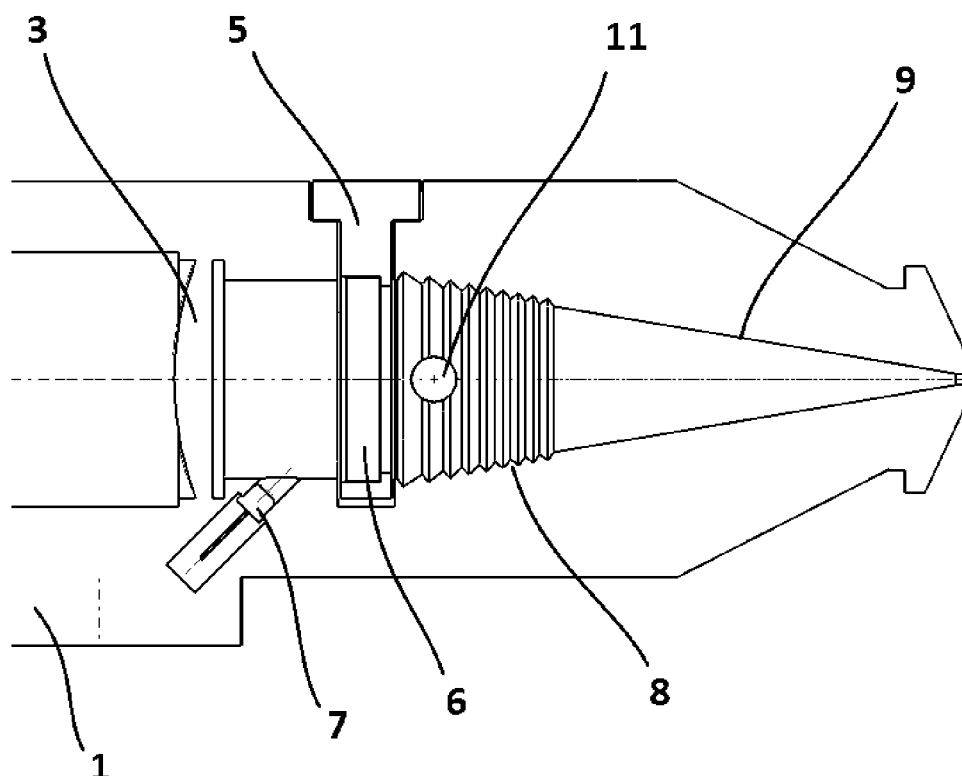
FIG. 3 shows the cutting gas inlet at the beginning of the cutting gas cone according to an example embodiment of the disclosure.

FIG. 3 shows the cutting gas inlet 11 at the beginning of the cutting gas cone 9 according to an example embodiment of the present disclosure. The optical element 6 in a drawer 5, the reflector 8, light sensor 7, focusing lens 3 and housing 1 can also be seen.

Figure 4:
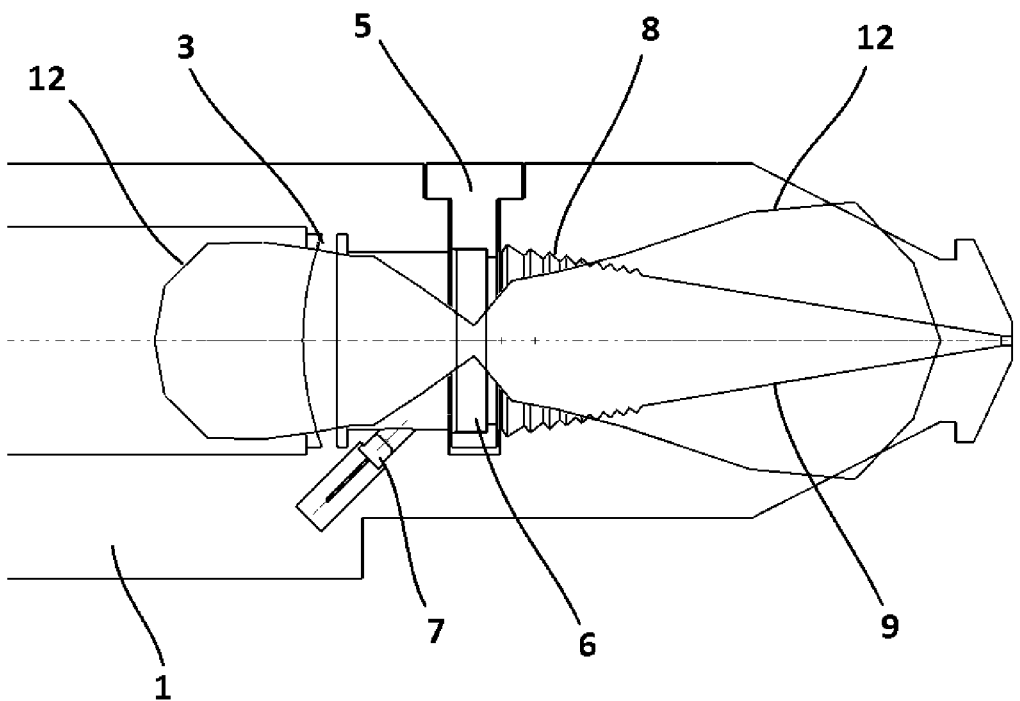
FIG. 4 shows the scattered light distribution starting from the protective glass as an optical element according to an example embodiment of the disclosure.

FIG. 4. shows the scattered light distribution 12 starting from the optical element 6, which is arranged in a drawer 5, according to an example embodiment of the present disclosure. The scattered light 12 is distributed on both sides of the optical element 6. The ring-shaped elements of the conical, staircase-shaped reflector 8 are arranged in the direction of propagation of the scattered light 12. The ring-shaped elements of the conical stair-shaped reflector 8 have an inner surface 81 (see FIG. 7), so that the beam direction of the scattered light strikes the respective inner surface at 90°. The different inclination between the inner surfaces 81 is used for focused reflection of the scattered light onto the light sensor 7 (see FIG. 7).

FIG. 5 shows the distribution of the signal-to-noise ratio 13 starting from the optical element 6, which is arranged in a drawer 5, according to an example embodiment of the present disclosure. It is easy to see that the arrangement and expansion of the ring-shaped elements of the conical, staircase-shaped reflector 8 are based on the distribution of the signal-to-noise ratio starting from the optical element 6.

FIG. 6 shows the signal ratio 13 of a dirty to a clean protective glass 6 plotted in polar coordinates, according to an example embodiment of the present disclosure. The beam propagation direction in the image is from left to right along the optical axis 15. A signal ratio of 1:1 means that the scattered light signal of a clean optical element is identical to a dirty element and therefore signal separation is not possible. The highest signal ratio of 1:5 (clean:dirty) is achieved in the beam propagation direction 30° from the optical axis. No values are displayed below 20°, as the laser beam spreads out here and measurement is therefore not possible.

FIG. 7 shows the arrangement and inclination of the reflective inner surfaces 81 of the reflector on the light sensor 7 with respect to the optical axis 15, according to an example embodiment of the present disclosure. The inner surfaces 81 reflect scattered radiation from the dirty optical element (not shown) onto the sensor 7. The reflector surfaces are arranged in such a way that a laser beam scattered by a particle from the center of the protective glass hits the sensor after being reflected by the reflector surfaces. However, the refraction of light passing through the protective glass is also taken into account.

A technical effect resulting from the features of the present disclosure is that the soiling or contamination of an optical element can be determined without the need to arrange a light sensor or other sensors in the direction of the beam path of the light behind the respective optical element. Due to the shape and arrangement of the conical staircase-shaped reflector, it is possible to determine contamination of the optical element.

An advantage of a device according to the present disclosure is that it is sufficient to arrange the reflector behind the optical element, whereby this has no influence on the function of the laser material processing head in the sense of disturbing the cutting gas flow or influencing the laser beam.

The present disclosure provides a sensor arrangement for reflecting scattered light from a laser beam, comprising
  a first optical element;
  a cone of a housing which is arranged in the direction of the beam path of a laser beam behind the first optical element, wherein the cone of the housing comprises a conical staircase-shaped reflector whose shape corresponds to the shape of the cone of the housing and wherein the conical staircase-shaped reflector is formed from a plurality of ring-shaped elements, each ring-shaped element having reflector surfaces on the inner side facing the beam path of the laser beam; and
  an element for receiving the light reflected by the respective reflector surfaces of the plurality of ring-shaped elements, which is arranged on the side of the optical element opposite to the cone of the housing.

In one embodiment of the sensor arrangement, the element for receiving the light reflected by the reflector surfaces is a light sensor.

It is further provided that the element for receiving the light reflected by the reflector surfaces is a deflecting mirror for reflecting the light onto a light sensor, the light sensor in one embodiment being a photodiode.

In one embodiment of the sensor arrangement according to the present disclosure, the respective reflector surfaces of the plurality of ring-shaped elements each have a different inclination with respect to the first optical element.

It is further provided that, in a sensor arrangement according to the present disclosure, the respective reflector surfaces of the plurality of ring-shaped elements are configured such that they are aligned with the element for receiving the light reflected by the respective reflector surfaces of the plurality of ring-shaped elements.

In one embodiment of a sensor arrangement, the light sensor is connected to a receiving and evaluation device.

The sensor arrangement, as described above, may have the conical staircase-shaped reflector arranged on the inside of the cone of the housing.

In one aspect of the sensor arrangement, the conical staircase-shaped reflector is part of the cone of the housing.

The present disclosure also provides a laser material processing head comprising
  an opening for coupling a laser beam;
  a sensor arrangement as described above.

In one embodiment, the cone of the housing of the laser material processing head is a cutting gas cone through which a cutting gas flows.

In one embodiment of the present disclosure, the laser material processing device comprises a laser material processing head as described above and a device for moving the laser material processing head.

Another embodiment of the present disclosure relates to a method for monitoring optical elements for contamination or soiling, comprising the steps of
  guiding a laser beam through a first optical element;
  reflecting of scattered radiation of the first optical element with a conical staircase-shaped reflector which is arranged in a cone of a housing which is arranged behind the first optical element in the direction of the beam path of the laser beam, wherein the shape of the conical staircase-shaped reflector corresponds to the shape of the cone of the housing and wherein the conical staircase-shaped reflector is formed from a plurality of ring-shaped elements, wherein each ring-shaped element has a reflector surface on the inner side facing the beam path of the laser beam;
  receiving the reflected scattered radiation with an element for receiving the light reflected from the respective reflector surfaces of the plurality of ring-shaped elements, which is arranged on the side of the optical element opposite to the cone of the housing.

In one embodiment of the method according to the present disclosure, the element for receiving the light reflected by the reflector surfaces is a light sensor.

The method can also be designed in such a way that the element for receiving the light reflected by the reflector surfaces is a deflecting mirror for reflecting the light onto a light sensor.

Furthermore, the method according to the present disclosure comprises a photodiode as light sensor.

In one embodiment, it is also provided that the light received by the light sensor is converted into electrical signals, which are processed by a receiving and evaluation device.

Other aspects, features and advantages of the present disclosure will readily be apparent from the following detailed description, which simply illustrates preferred embodiments and implementations. The present disclosure may also be realized in other and different embodiments and its various details may be modified in various obvious aspects without departing from the teachings and scope of the present disclosure. Accordingly, the drawings and descriptions are to be considered illustrative and not limiting. Additional features and advantages of the disclosure are set forth in part in the following description and will be apparent in part from the description or may be inferred from the embodiment of the disclosure.

What is claimed is:

1. A sensor arrangement for reflecting scattered light from a laser beam, comprising
  a first optical element;
  a cone of a housing which is arranged in the direction of the beam path of a laser beam behind the first optical element, wherein the cone of the housing comprises a conical staircase-shaped reflector whose shape corresponds to the shape of the cone of the housing and wherein the conical staircase-shaped reflector is formed from a plurality of ring-shaped elements, each ring-shaped element having reflector surfaces on the inner side facing the beam path of the laser beam; and
  an element for receiving the light reflected by the respective reflector surfaces of the plurality of ring-shaped elements, which is arranged on the side of the optical element opposite to the cone of the housing.

2. The sensor arrangement according to claim 1, wherein the element for receiving the light reflected by the reflector surfaces is a light sensor.

3. The sensor arrangement according to claim 1, wherein the element for receiving the light reflected by the reflector surfaces is a deflecting mirror for reflecting the light onto a light sensor.

4. The sensor arrangement according to claim 3, wherein the light sensor is a photodiode.

5. The sensor arrangement according to claim 1, wherein the respective reflector surfaces of the plurality of ring-shaped elements each have a different inclination with respect to the first optical element.

6. The sensor arrangement according to claim 1, wherein the respective reflector surfaces of the plurality of ring-shaped elements are formed such that they are aligned with the element for receiving the light reflected by the respective reflector surfaces of the plurality of ring-shaped elements.

7. The sensor arrangement according to claim 2, wherein the light sensor is connected to a receiving and evaluating device.

8. The sensor arrangement according to claim 1, wherein the conical staircase-shaped reflector is arranged on the inside of the cone of the housing.

9. The sensor arrangement according to claim 1, wherein the conical staircase-shaped reflector is part of the cone of the housing.

10. A laser material processing apparatus comprising a laser material processing head according to claim 8 or 9 and a device for moving the laser material processing head.

11. A laser material processing head comprising an opening for coupling a laser beam;

a first optical element;

a cone of a housing which is arranged in the direction of the beam path of a laser beam behind the first optical element, wherein the cone of the housing comprises a conical staircase-shaped reflector whose shape corresponds to the shape of the cone of the housing and wherein the conical staircase-shaped reflector is formed from a plurality of ring-shaped elements, each ring-shaped element having reflector surfaces on the inner side facing the beam path of the laser beam; and an element for receiving the light reflected by the respective reflector surfaces of the plurality of ring-shaped elements, which is arranged on the side of the optical element opposite to the cone of the housing.

12. The laser material processing head according to claim 11, wherein the cone of the housing is a cutting gas cone through which a cutting gas flows.

13. A method for monitoring optical elements for contamination or soiling, comprising:

guiding a laser beam through a first optical element;

reflecting of scattered radiation of the first optical element with a conical staircase-shaped reflector which is arranged in a cone of a housing which is arranged behind the first optical element in the direction of the beam path of the laser beam, wherein the shape of the conical staircase-shaped reflector corresponds to the shape of the cone of the housing and wherein the conical staircase-shaped reflector is formed from a plurality of ring-shaped elements, wherein each ring-shaped element has a reflector surface on the inner side facing the beam path of the laser beam;

receiving the reflected scattered radiation with an element for receiving the light reflected from the respective reflector surfaces of the plurality of ring-shaped elements, which is arranged on the side of the optical element opposite to the cone of the housing.

14. The method according to claim 13, wherein the element for receiving the light reflected from the reflector surfaces is a light sensor.

15. The method according to claim 13, wherein the element for receiving the light reflected from the reflector surfaces is a deflecting mirror for reflecting the light onto a light sensor.

16. The method according to claim 14, wherein the light sensor is a photodiode.

17. The method according to claim 14, wherein the light received by the light sensor is converted into electrical signals which are processed by a receiving and evaluating device.

* * * * *